(12) United States Patent
Jang et al.

(10) Patent No.: US 7,859,611 B2
(45) Date of Patent: Dec. 28, 2010

(54) DIFFUSER PRISM SHEET HAVING AMORPHOUS LIGHT DIFFUSERS ON PRISM VALLEYS, BACKLIGHT UNIT USING THE SAME, MOLD, AND ASSOCIATED METHODS

(75) Inventors: Seok Hoon Jang, Uiwang-si (KR); Man Suk Kim, Uiwang-si (KR); Jun Hyeak Choi, Uiwang-si (KR); Ju Yeol Choi, Uiwang-si (KR)

(73) Assignee: Cheil Industries, Inc., Gumi-si, Gyeongsangbuk-do (KR)

( * ) Notice: Subject to any disclaimer, the term of this patent is extended or adjusted under 35 U.S.C. 154(b) by 301 days.

(21) Appl. No.: 12/213,429

(22) Filed: Jun. 19, 2008

(65) Prior Publication Data

US 2008/0316603 A1 Dec. 25, 2008

(30) Foreign Application Priority Data

Jun. 19, 2007 (KR) ...................... 10-2007-0059751

(51) Int. Cl.
*G02F 1/13357* (2006.01)

(52) U.S. Cl. .......................... 349/64; 362/339; 362/355; 359/599

(58) Field of Classification Search ................. 359/599; 362/339, 355, 620, 626; 428/323; 349/64
See application file for complete search history.

(56) References Cited

U.S. PATENT DOCUMENTS

| 6,798,574 | B2 * | 9/2004 | Kim | ............................ 359/566 |
| 7,382,537 | B2 * | 6/2008 | Lin | ............................ 359/625 |
| 2005/0237641 | A1 * | 10/2005 | Tang | .......................... 359/831 |
| 2008/0088933 | A1 * | 4/2008 | Lin | ............................ 359/599 |
| 2008/0130316 | A1 * | 6/2008 | Kinoshita et al. | ........... 362/620 |
| 2008/0151375 | A1 * | 6/2008 | Lin | ............................ 359/599 |
| 2010/0103351 | A1 * | 4/2010 | Han et al. | ...................... 349/65 |

\* cited by examiner

*Primary Examiner*—Mark Consilvio
(74) *Attorney, Agent, or Firm*—Lee & Morse, P.C.

(57) ABSTRACT

A diffuser prism sheet includes a transparent base film having a first surface and a second surface, a light refractor at the first surface of the base film, the light refractor including a plurality of unit prisms having a major axis extending in a first direction and having a predetermined cross sectional shape that defines valleys between adjacent unit prisms, and light diffusers including amorphous polygonal bosses in the valleys between adjacent unit prisms.

18 Claims, 7 Drawing Sheets

DIFFUSER PRISM SHEET HAVING AMORPHOUS LIGHT DIFFUSERS ON PRISM VALLEYS, BACKLIGHT UNIT USING THE SAME, MOLD, AND ASSOCIATED METHODS

BACKGROUND OF THE INVENTION

1. Field of the Invention

Embodiments relate to a diffuser prism sheet, a backlight unit using the same, a mold, and associated methods.

2. Description of the Related Art

Generally, a display device that is non-emissive, e.g., a liquid crystal display device (hereinafter referred to as an "LCD"), includes a backlight unit as a light source to emit light. Particularly in large display devices, it may be difficult to provide uniform illumination over a large area. Such difficulties may become more pronounced with low-power light sources, which may make it difficult to provide an energy-conserving device having a large display area. Accordingly, there is a need for advances in display device technology that provide uniform illumination and enable the use of low power backlight units.

SUMMARY OF THE INVENTION

Embodiments are therefore directed to a diffuser prism sheet, a backlight unit using the same, a mold, and associated methods, which substantially overcome one or more of the problems due to the limitations and disadvantages of the related art.

It is therefore a feature of an embodiment to provide a diffuser prism sheet having amorphous light diffusers on prism valleys, a backlight unit using the same, a mold, and associated methods.

At least one of the above and other features and advantages may be realized by providing a diffuser prism sheet, including a transparent base film having a first surface and a second surface, a light refractor at the first surface of the base film, the light refractor including a plurality of unit prisms having a major axis extending in a first direction and having a predetermined cross sectional shape that defines valleys between adjacent unit prisms, and light diffusers including amorphous polygonal bosses in the valleys between adjacent unit prisms.

The light diffusers and the light refractor may be a monolithic structure. At least 50% of the light diffusers may be distributed in the valleys at a height that is below one-half of a height of the corresponding unit prisms, the height of the unit prisms being determined normal to the second surface.

The transparent base film may include one or more of glass, synthetic resin, or metallic material. The unit prisms may have a cross sectional shape that is triangular, semicircular shape, or trapezoidal. The unit prisms may be immediately adjacent to one another. The unit prisms may be spaced apart by a constant interval such that planes parallel to a major surface of the base film exits in the valleys between adjacent unit prisms.

A height of the unit prisms may be about ½ to about ⅔ of a pitch of the unit prisms. The unit prisms may have a triangular cross sectional shape, and a vertex angle of the unit prisms may be about 30° to about 120°. A size of the light diffusers may be about 0.01 to about 0.9 times the pitch of the unit prisms.

A liquid crystal display backlight unit may include the diffuser prism sheet and a light guide plate, the diffuser prism sheet being disposed at a light emitting surface of the light guide plate. A liquid crystal display device may include the backlight unit.

At least one of the above and other features and advantages may also be realized by providing a mold, including a first surface and a second surface, a plurality of intaglio unit prisms in the first surface, the intaglio unit prisms having a major axis extending in a first direction and having a predetermined cross sectional shape that defines ridges between adjacent intaglio unit prisms, and intaglio light diff-users including amorphous intaglio polygonal shapes in the ridges between adjacent intaglio unit prisms.

At least 50% of the intaglio light diffusers may be distributed in the ridges of the mold at a height that is at or above one-half of a height of the corresponding intaglio unit prisms, the height of the unit intaglio prisms being determined normal to the second surface. A method of fabricating a diffuser prism sheet may include providing a transparent film, and embossing a predetermined pattern in the transparent film, the embossing including pressing the mold against the transparent film.

BRIEF DESCRIPTION OF THE DRAWINGS

The above and other features and advantages will become more apparent to those of ordinary skill in the art by describing in detail example embodiments with reference to the attached drawings, in which.

DETAILED DESCRIPTION OF THE INVENTION

Korean Patent Application No. 10-2007-0059751, filed on Jun. 19, 2007, in the Korean Intellectual Property Office, and entitled: "Diffuser Prism Sheet Comprising Amorphous Light Diffuser On Prism Valley and LCD Backlight Unit Using the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include an $n^{th}$ member, where n is greater than 3, whereas the expression "at least one selected from the group consisting of A, B, and C" does not.

As used herein, the expression "or" is not an "exclusive or" unless it is used in conjunction with the term "either." For example, the expression "A, B, or C" includes A alone; B alone; C alone; both A and B together; both A and C together; both B and C together; and all three of A, B and, C together, whereas the expression "either A, B, or C" means one of A alone, B alone, and C alone, and does not mean any of both A and B together; both A and C together; both B and C together; and all three of A, B and C together.

Figure 1:
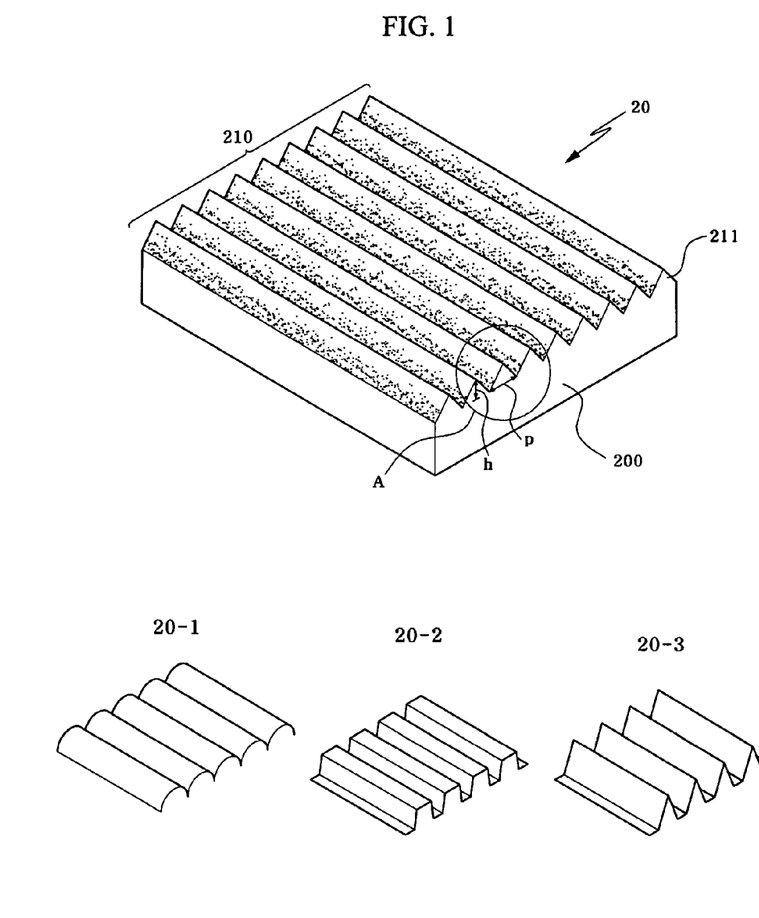
FIG. 1 illustrates a schematic perspective view of a diffuser prism sheet in accordance with an embodiment.
Figure 3:
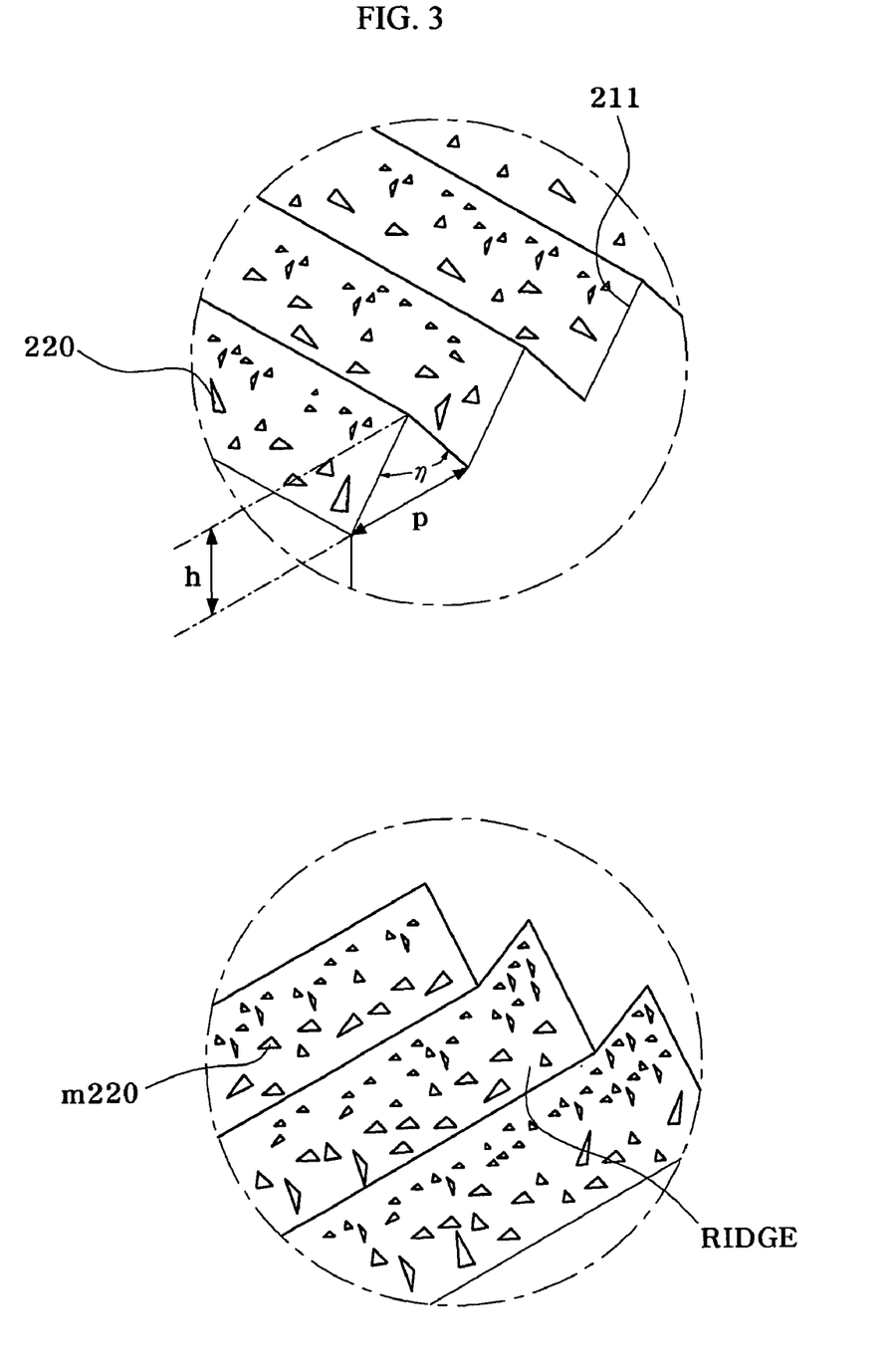
FIG. 3 illustrates an enlarged perspective view of inset "A" shown in FIG. 1, as well as an enlarged partial view of a corresponding mold.

FIG. 1 illustrates a schematic perspective view of a diffuser prism sheet in accordance with an embodiment, and FIG. 3 illustrates an enlarged perspective view of inset "A" shown in FIG. 1, as well as an enlarged partial view of a corresponding mold.

Referring to FIGS. 1 and 3, a diffuser prism sheet 20 in accordance with an embodiment includes a base film 200, a light refractor 210 having a plurality of prisms 211, and light diffusers 220 on the light refractor 210.

The base film 200 may be a base layer of the diffuser prism sheet 20. The base layer may be a separately-formed layer, or the diffuser prism sheet may be formed monolithically from a single sheet of material. The base film 200 may be a transparent material such as a transparent synthetic resin, e.g., polyethylene, polypropylene, polycarbonate, or the like. In another implementation, the base film 200 may be glass. In another implementation, the base film 200 may be a metallic thin film. The thickness of the base film 200 is not particularly limited. In an implementation, the thickness may be one to many microns.

In an implementation, the diffuser prism sheet may be configured so that light enters at the side corresponding to the base film 200. The light refractor 210 may refract light that has passed through the base film 200, and may provide light with predetermined orientation. The light refractor 210 may be formed at a surface of the base film 200.

In an embodiment, it is preferred that the light refractor 210 have a prism shape. Specifically, the light refractor 210 may include a plurality of unit prisms 211 arranged on a surface of the base film 200 to refract light emitted from the base film 200 in a predetermined direction.

FIGS. 1 and 3 illustrate examples in which the unit prisms 211 of the light refractor 210 each have a triangular cross-sectional shape and take the form of a triangular prism on the whole. However, the cross-sectional shape of the unit prisms 211 constituting the light refractor 210 is not limited to a triangular shape. For example, other transparent objects are applicable to the present embodiment, such as transparent objects that include at least two optical light refracting planes with at least one of two optical light refracting planes being shaped to refract non-parallel light. Such implementations may have a semicircular shape (also referred to as semi-cylindrical or lenticular), or a trapezoidal shape. The cross-sectional shape of the unit prisms 211 may be determined according to characteristics of the particular devices, a desired viewing angle, screen size, and other factors.

Preferably, the plurality of unit prisms 211 constituting the light refractor 210 is arranged such that the unit prisms have a major axis extending in a first direction and come into close contact with one another in a second direction orthogonal to the first direction without any separation between adjacent unit prisms. In another implementation, e.g., where directional light is desired instead of, or in addition to, light refraction, spacing planes may be provided between the respective neighboring unit prisms 211. Thus, the unit prisms 211 may be spaced apart from each other by a predetermined distance in a direction orthogonal to the major axis, rather than being densely arranged to touch one another.

The height h of the unit prisms 211 is preferably about 5 μm to about 500 μm, and is preferably about ½ to about ⅔ of the pitch p of the unit prisms 211. The height h of the unit prisms 211 may be determined as an average height, e.g., where it is difficult to define the unit prisms 211 as having a same height. Also, when the unit prisms 211 have a triangular cross sectional shape, a vertex angle η is preferably about 30° to about 120°.

Referring to the detailed illustration in FIG. 3, the light diffusers 220 may take the form of irregular or amorphous polygonal bosses. The term "amorphous", is used to mean "randomly distributed" (e.g., randomly distributed in the lower half of the height h of the prism) and/or "randomly sized". In an implementation, the light diffusers 220 may be distributed at a lower end region of the light refractor 210, i.e., at lower ends of valleys defined between the respective neighboring unit prisms 211. Preferably, 50% or more of the light diffusers 220 are distributed in the valleys between respective neighboring unit prisms 211 of the light refractor 210, and are distributed below half of the height h of the unit prisms 211. The diffusers 220 occupy the lower ⅔ of the surface size.

The light diffusers 220 may include a plurality of irregular bosses, and may be provided at lower ends of the unit prisms 211 to cover a surface of the light refractor 210 in such a manner that some of the bosses come into close contact with one another and the remaining bosses are spaced apart from one another by different distances, i.e., the area density of the light diffusers 220 may increase towards bottoms of the valleys.

Preferably, the light diff-users 220 have a size (here, the term "size" designates the length of the longest region) smaller than the size of the light refractor 210. More specifically, a ratio of a semi-major radius of a light diffuser 220 to the prism pitch is preferably about 0.01 to about 0.9, and a ratio of the height of the light diffuser 220 to the height h of the light refractor 210 is about 0.1 to about 0.9.

The light diffusers 220 may slightly diffuse light, which has passed through the base film 200 and the light refractor 210, at a surface of the light refractor 210. In particular, "slight diffusion" means to diffuse light to the surroundings to the maximum extent while maintaining a reduction in the brightness of refracted light within a range of about 5 to about 10%.

Preferably, in the fabrication of the above-described diffuser prism sheet 20, an intaglio prism shaped mold is used, i.e., a mold that has a surface that is the inverse of the diffuser prism sheet surface 20. Referring again to FIG. 3, the mold may have intaglio prisms m220 or recessed prisms according to an embodiment. The mold may have a plurality of intaglio unit prisms in a first surface, the intaglio unit prisms having a major axis extending in the first direction and having a predetermined cross sectional shape that defines ridges between adjacent intaglio unit prisms. Intaglio light diffusers including amorphous intaglio polygonal shapes may be defined in the ridges between adjacent intaglio unit prisms. After the processing of prisms, the prism shape is sandblasted using the amorphous sand. Due to the size of the abrasive particle, the sandblasting shape remains intensively at the ridge region. Making the film with the sandblasting shape, the embossed sandblasting shape remains at the valley region. The embossed sandblasting shape acts as diffusers.

The light refractor 210 may be fabricated by pressing the mold onto a transparent film having a constant thickness, so as to leave an embossed prism corresponding to the intaglio prism at a surface of the transparent film. The upper surface of the transparent film may define the light refractor 210 including the unit prisms 211, and a lower surface of the transparent film may become the base film 200, i.e., the light refractor 210 and the base film 200 may be monolithic. The mold-based process may simultaneously form the light refractor 210 and the light diffusers 220. Using the above-described mold in a pressing operation may enable the fabrication of the diffuser prism sheet 20 in which the light refractor 210 and the light diffusers 220 are integrally formed with each other.

Figure 2:
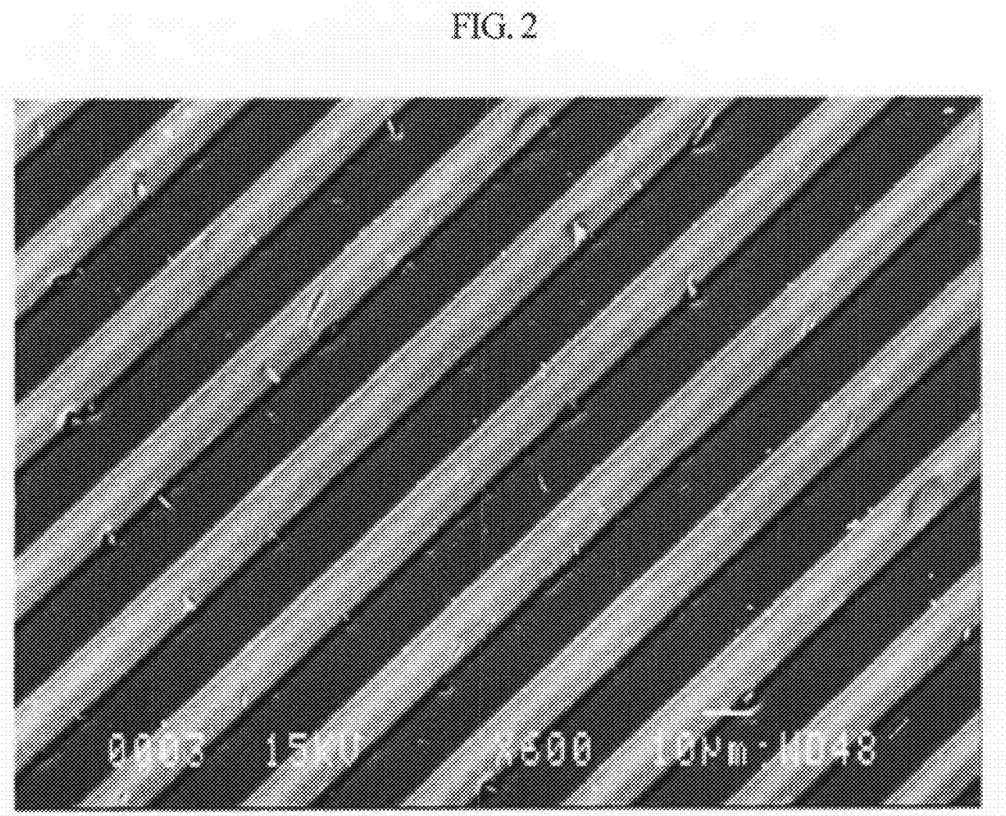
FIG. 2 illustrates an electron-micrograph of an actual model of the diffuser prism sheet of FIG. 1.
Figure 4:
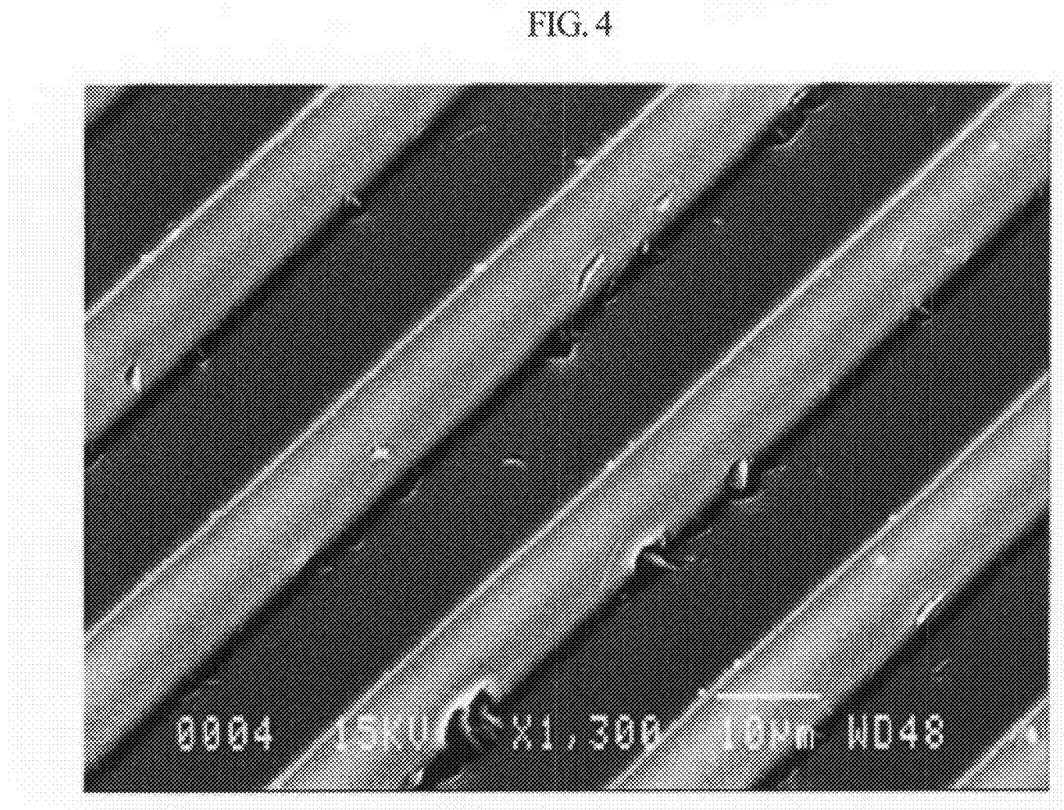
FIG. 4 illustrates an enlarged portion of the electron-micrograph shown in FIG. 2.

FIG. 2 illustrates an electron-micrograph of an actual model of the diffuser prism sheet of FIG. 1, and FIG. 4 illustrates an enlarged portion of the electron-micrograph shown in FIG. 2. In the model shown in FIGS. 2 and 4, a light refractor having successive unit prisms is formed over a film having a constant thickness. Light diffusers, in the form of amorphous polygonal bosses, are formed at a lower portion of the light refractor in valleys between the respective neighboring unit prisms of the light refractor.

The diffuser prism sheet 20 may be disposed on a light emitting surface of a light guide plate. Using the diffuser prism sheet 20 as a diffuser film may eliminate the need for a separate diffuser sheet to be used with the light guide plate.

The diffuser prism sheet 20 according to an embodiment may be applicable to various kinds of light guide plates for an LCD, e.g., an edge-type light source having a light source disposed at a side of the light guide plate, or a direct-type light source having a light source disposed below the light guide plate. In addition, the diffuser prism sheet 20 according to an embodiment may be used in conjunction with various kinds of light sources including, e.g., cold-cathode fluorescent (CCFL) light sources, light emitting diode (LED) light sources, etc.

Figure 7:
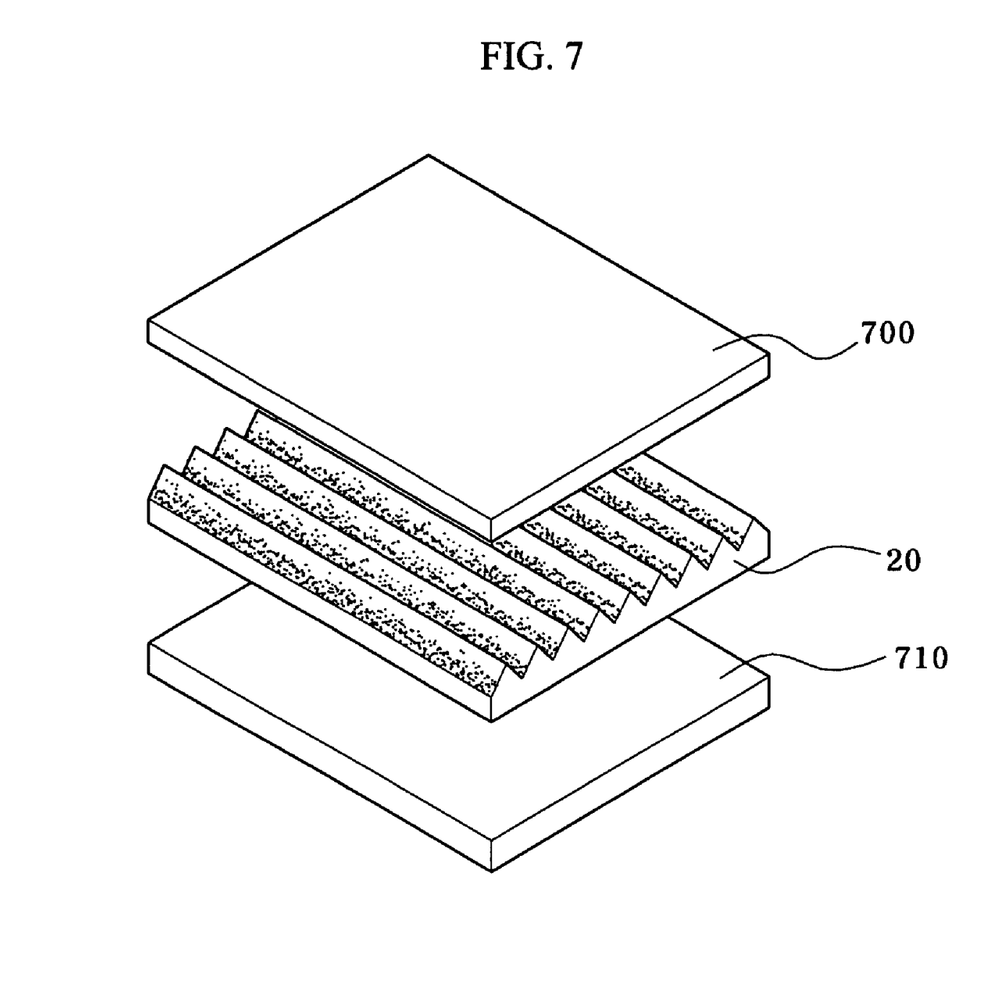
FIG. 7 illustrates a perspective schematic view of a display device according to an embodiment.

FIG. 7 illustrates a perspective schematic view of a display device according to an embodiment.

Referring to FIG. 7, a display device may include a display panel 700, e.g., a LCD panel, as well as the diffuser prism sheet 20 and a backlight unit 710. In an implementation, the prism sheet 20 may be oriented such that the base film 200 is adjacent to the backlight unit 710, and between the light refractor 210 and the backlight unit 710.

The following Example and Comparative Example are provided in order to set forth particular details of one or more embodiments. However, it will be understood that the embodiments are not limited to the particular details described.

EXAMPLE

A sample was fabricating having a triangular cross-section light refractor having prisms which exhibited a vertex angle of 90°, and a height and pitch of about 50 μm. Light diffusers in the form of irregular amorphous polygonal bosses were provided at a lower end of the light refractor. The bosses had a diameter equal to 10 to 80% of the prism pitch, and the height of the light diffuser region was 80% of the prism height, as measured from the lower end of the light refractor.

Comparative Example

As the Comparative Example, a sample was fabricated that included only a light refractor having a vertex angle of 90°, and a height and pitch of about 50 μm. The Comparative Example was formed using the same kind of starting base film having the same initial physical values, such as transparency, haze, thickness, etc., as those of the starting base film used in the above-described Example.

Analysis

Figure 5:
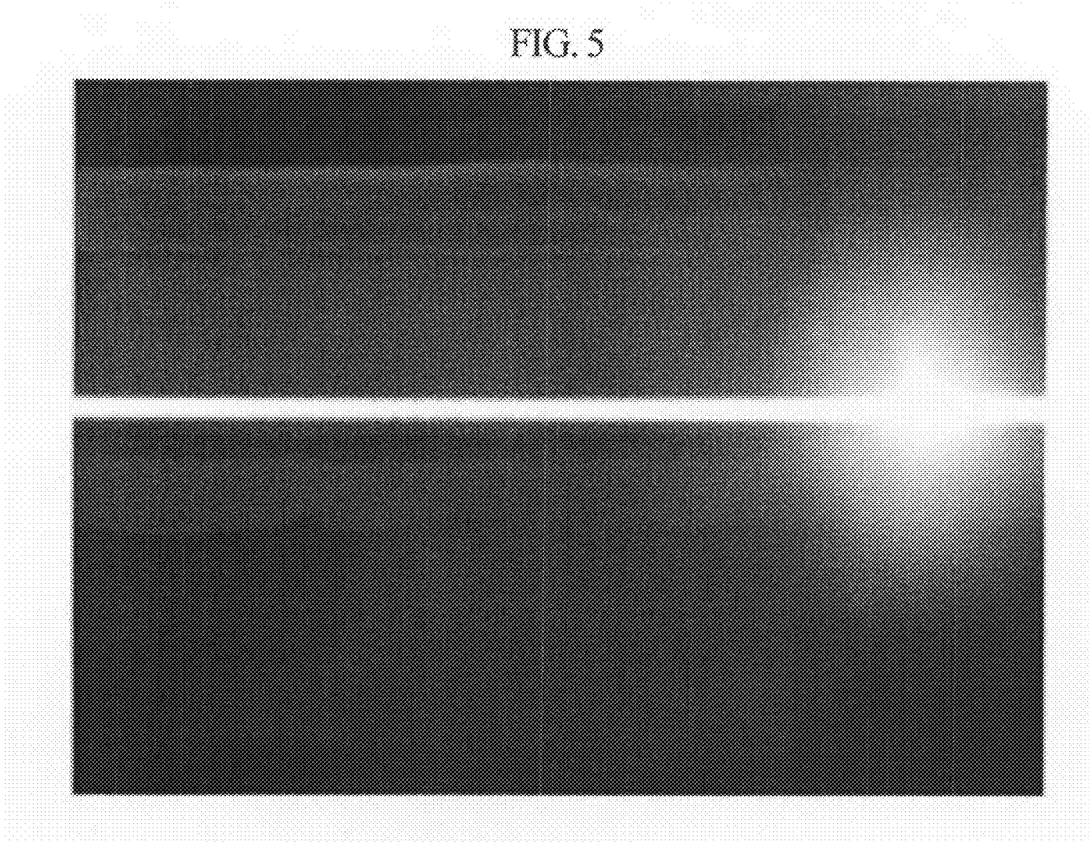
FIG. 5 illustrates an image of experimental results for a Comparative Example.
Figure 6:
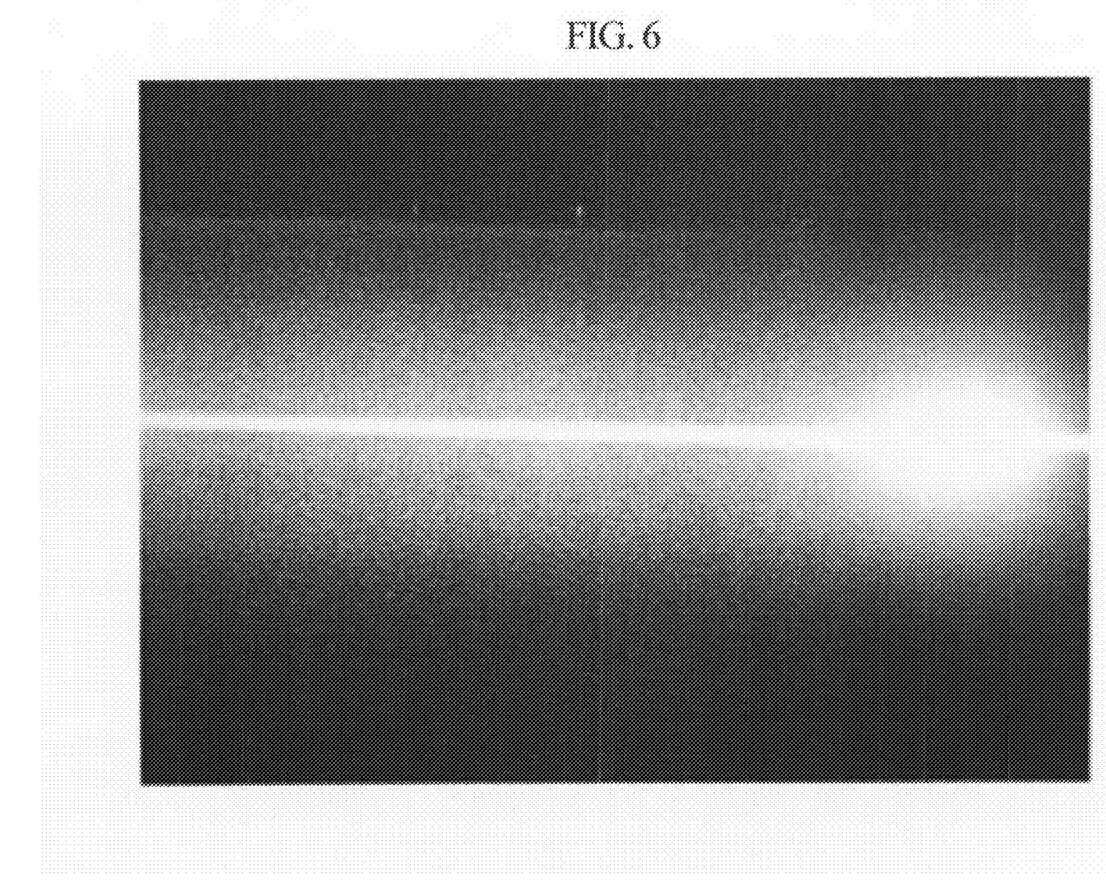
FIG. 6 illustrates an image of experimental results for an Example fabricated according to an embodiment.

Using the samples fabricated in the Example and the Comparative Example as described above, surface brightness, haze, and transmittance were measured. FIG. 5 illustrates an image of experimental results for a Comparative Example sample, and FIG. 6 illustrates an image of experimental results for an Example sample fabricated according to an embodiment. Further, Table 1 illustrates the brightness, haze, and transmittance of the samples fabricated in the Example and the Comparative Example. The brightness is measured by the measurement apparatus 'BM-7' which uses 17 inch BLU. The haze and the transmittance is measured by the measurement apparatus 'Haze Meter'. After putting up the diffuser film on the light guide plate and putting up the diffuser prism on the diffuser film, the brightness is measured. After sampling the diffuser prism with the size 5 cm×5 cm, the haze and the transmittance is measured.

TABLE 1

|  | Example | Comparative Example |
| --- | --- | --- |
| Brightness | 6378 | 6550 |
| Haze (%) | 89.51 | 87.52 |
| Transmittance (%) | 25.06 | 6.17 |

Referring to FIG. 5 and Table 1, the Comparative Example sample exhibited high central brightness, but did not achieve efficient diffusion of light. More specifically, as set forth in Table 1, the Comparative Example sample had a central brightness value of 6,550 cd/m$^2$, a haze of 87.52%, and a transmittance of 6.17%.

Referring to FIG. 6 and Table 1, the Example sample maintained substantially the same level of central brightness as the Comparative Example sample, although the central brightness was slightly reduced. Also, the Example sample exhibited superior diffusion of light as compared to the Comparative Example sample. More specifically, as set forth in Table 1, the Example sample had a central brightness value of 6,378 cd/m$^2$, a haze of 89.51%, and a transmittance of 25.06%. Thus, a light guide plate fabricated using the diffuser prism sheet 20 according to an embodiment may achieve an appropriate haze, i.e., an appropriate degree of light spreading, and excellent transmittance of light, without a significant reduction in brightness.

As described above, embodiments may provide a diffuser prism sheet having functions of both light refraction and light diffusion. The diffusion sheet may efficiently diffuse light while also refracting light for providing the light with predetermined orientation, and may limit reduction in central brightness to 2% to 3%, or less. The diffuser prism sheet may help enable the fabrication of a light guide plate, e.g., for an LCD backlight unit, exhibiting excellent brightness, light diffusion, and transmittance.

Furthermore, the use of the diffuser prism sheet according to an embodiment may allow a separate diffuser sheet to be omitted when fabricating a light guide plate, which may reduce manufacturing costs of the light guide plate and result in a reduced thickness of the light guide plate. Moreover, the diffuser prism sheet according to an embodiment may efficiently diffuse light throughout the overall area of a large-scale panel while achieving uniform light distribution.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A diffuser prism sheet, comprising:
   a transparent base film having a first surface and a second surface;
   a light refractor at the first surface of the base film, the light refractor including a plurality of unit prisms having a major axis extending in a first direction and having a predetermined cross sectional shape that defines valleys between adjacent unit prisms; and
   light diffusers including amorphous polygonal bosses in the valleys between adjacent unit prisms.

2. The diffuser prism sheet as claimed in claim 1, wherein the light diffusers and the light refractor are a monolithic structure.

3. The diffuser prism sheet as claimed in claim 1, wherein at least 50% of the light diffusers are distributed in the valleys at a height that is below one-half of a height of the corresponding unit prisms, the height of the unit prisms being determined normal to the second surface.

4. The diffuser prism sheet as claimed in claim 1, wherein the transparent base film includes one or more of glass, synthetic resin, or metallic material.

5. The diffuser prism sheet as claimed in claim 1, wherein the unit prisms have a cross sectional shape that is triangular, semicircular shape, or trapezoidal.

6. The diffuser prism sheet as claimed in claim 1, wherein the unit prisms are immediately adjacent to one another.

7. The diffuser prism sheet as claimed in claim 1, wherein the unit prisms are spaced apart by a constant interval such that planes parallel to a major surface of the base film exits in the valleys between adjacent unit prisms.

8. The diffuser prism sheet as claimed in claim 1, wherein a height of the unit prisms is about ½ to about ⅔ of a pitch of the unit prisms.

9. The diffuser prism sheet as claimed in claim 8, wherein the unit prisms have a triangular cross sectional shape, and a vertex angle of the unit prisms is about 30° to about 120°.

10. The diffuser prism sheet as claimed in claim 8, wherein a size of the light diffusers is about 0.01 to about 0.9 times the pitch of the unit prisms.

11. The diffuser prism sheet as claimed in claim 1, wherein a size of the light diffusers is about 0.01 to about 0.9 times a pitch of the unit prisms.

12. The diffuser prism sheet as claimed in claim 11, wherein an area density of the light diffusers increases towards bottoms of the valleys.

13. A liquid crystal display backlight unit, comprising:
    the diffuser prism sheet as claimed in claim 1; and
    a light guide plate, wherein:
    the diffuser prism sheet is disposed at a light emitting surface of the light guide plate.

14. A liquid crystal display device, comprising the backlight unit as claimed in claim 13.

15. A mold, comprising:
    a first surface and a second surface;
    a plurality of intaglio unit prisms in the first surface, the intaglio unit prisms having a major axis extending in a first direction and having a predetermined cross sectional shape that defines ridges between adjacent intaglio unit prisms; and
    intaglio light diffusers including amorphous intaglio polygonal shapes in the ridges between adjacent intaglio unit prisms.

16. The mold as claimed in claim 15, wherein at least 50% of the intaglio light diffusers are distributed in the ridges of the mold at a height that is at or above one-half of a height of the corresponding intaglio unit prisms, the height of the unit intaglio prisms being determined normal to the second surface.

17. The mold as claimed in claim 15, wherein an area density of the intaglio light diffusers increases towards tops of the ridges.

18. A method of fabricating a diffuser prism sheet, comprising:
    providing a transparent film; and
    embossing a predetermined pattern in the transparent film, the embossing including pressing the mold as claimed in claim 15 against the transparent film.

* * * * *